March 2, 1971  J. H. WINKLER, JR  3,566,682

RADIOACTIVITY AND ELECTRICAL LOGGING TOOL COMBINATION

Filed Jan. 22, 1969  2 Sheets-Sheet 1

INVENTOR.
JOHN H. WINKLER, JR.

BY *John P. Sinnott*

ATTORNEYS

March 2, 1971 J. H. WINKLER, JR 3,566,682
RADIOACTIVITY AND ELECTRICAL LOGGING TOOL COMBINATION
Filed Jan. 22, 1969 2 Sheets-Sheet 2

INVENTOR.
JOHN H. WINKLER, JR.

BY John P. Sinnott
ATTORNEY

United States Patent Office 3,566,682
Patented Mar. 2, 1971

3,566,682
RADIOACTIVITY AND ELECTRICAL LOGGING TOOL COMBINATION
John H. Winkler, Jr., Houston, Tex., assignor to Schlumberger Technology Corporation, New York, N.Y.
Filed Jan. 22, 1969, Ser. No. 792,974
Int. Cl. E21b *49/00*
U.S. Cl. 73—152
5 Claims

ABSTRACT OF THE DISCLOSURE

An illustrative embodiment of the invention is directed to a combination sidewall redioactivity and electrical logging tool. One or more radiation detectors spaced from a source of radioactivity are housed within a skid that is urged against the borehole wall. A backup pad extending from the opposite side of the logging tool also is urged against the borehole wall. The working surface of the pad is formed of a tough electrical insulator that supports three vertically spaced electrodes. The electrodes are either flush with or recessed in the face of the insulator. This structural arrangement prevents the exposed electrodes from being short-circuited through the drilling mud or from being torn off the pad during operation.

BACKGROUND OF THE INVENTION

Field of the invention

This invention relates to measuring techniques and more specifically to a method and apparatus that provide radioactivity and electrical formation data during transport through a borehole, and the like.

Description of the prior art

Borehole logging tools that combine radioactivity and electrical resistivity techniques have been proposed in the past. Typically, these devices comprise a housing that contains a source of gamma or neutron radiation and a radiation detector within the same housing that is spaced from the source. The detector responds to a radioactive characteristic of the adjacent earth formation to provide a signal that can be analyzed to indicate if oil is present. Frequently, a tool of this sort is urged or pressed against one side of the borehole wall by a bowspring in order to reduce the film of drilling fluid and mudcake that usually exists between the formation under study and the tool.

According to these proposals, variations in the borehole diameter and cracks within the formation are detected by observing the formation's electrical resistivity. This resistivity is measured, it is suggested, through two bare electrodes that protrude from the side of the tool that is pressed against the formation. This proposal, however, is subject to several practical difficulties. For example, the protruding and exposed position of the electrodes leads to electrical short circuits through the mudcake and the drilling fluid that distorts the apparent formation resistivity. The protruding position of these electrodes adjacent to the radiation detector also introduces a certain inherent degree of tool "stand-off." In this circumstance, the electrodes prevent the tool from directly engaging the formation and necessarily interpose a film of mudcake or drilling fluid between the formation and the tool that is at least equal to the forward extent of the electrodes. This film tends to degrade the quality of the radioactivity log. The small diameter of a practical radioactivity logging tool, frequently on the order of three or four inches, and the conflicting requirement between the volume needed for the radiation detector and the volume needed for the adjacent electrodes with their associated fittings and wiring leads to an almost insurmountable mechanical design problem. As the logging tool is drawn upwardly through the borehole the exposed position of the electrodes and normal borehole rugosity often will combine to tear the electrodes from the housing.

Frequently, petroleum engineers and geologists are required to compare two or more different types of radioactivity log obtained during separate trips through the borehole. Distinctive time constants and logging speeds are required for each of these techniques in order to produce signals that express the observed radiations in terms of "count rates." Because the tools usually are drawn up through the borehole during logging, these time constant differences introduce depth ambiguities among the different logs. In this connection, a specific count rate for a radioactivity log represents an accumulation of counts divided by the time interval allotted to acquire the counts. The counts are observed, moreover, as the tool is drawn through a borehole distance that is determined by the logging speed and the detector time constant. These factors are entirely different in a neutron-porosity logging system than they are in, for example, a gamma ray-density system. Consequently, an attempt to match these two logs on the basis of borehole depth in order to compare the formation porosity to the density is subject to some error.

SUMMARY

In accordance with the invention, these problems are overcome by means of a downhole sonde that urges a skid with a radioactivity logging tool against the earth formation on one side of the borehole wall and urges a pad that contains the formation-resistivity measuring electrodes against the opposite side of the borehole wall. The pad preferably is formed of a hard rubber insulator in which three closely spaced electrodes are mounted either flush with or in recesses within the working surface in order to eliminate short circuits and electrode damage.

Because the electrodes are closely spaced, the location of these electrical measurements along the borehole wall can be determined with accuracy. If a subsequent and different radioactivity log is run in conjunction with another electrical log of the same or of a similar type the depth ambiguity caused by different logging speeds and time constants can be overcome through a correlation of the two electrical logs. This feature of the invention eliminates the need for the log analyst to exercise personal judgment when depth matching two radioactivity logs that have been run at different times in the same borehole.

For a better understanding of the present invention, together with other and further objects thereof, reference is had to the following description taken in connection with the accompanying drawings, the scope of the invention being pointed out in the appended claims.

DESCRIPTION OF THE PREFERRED EMBODIMENTS

Figure 1:
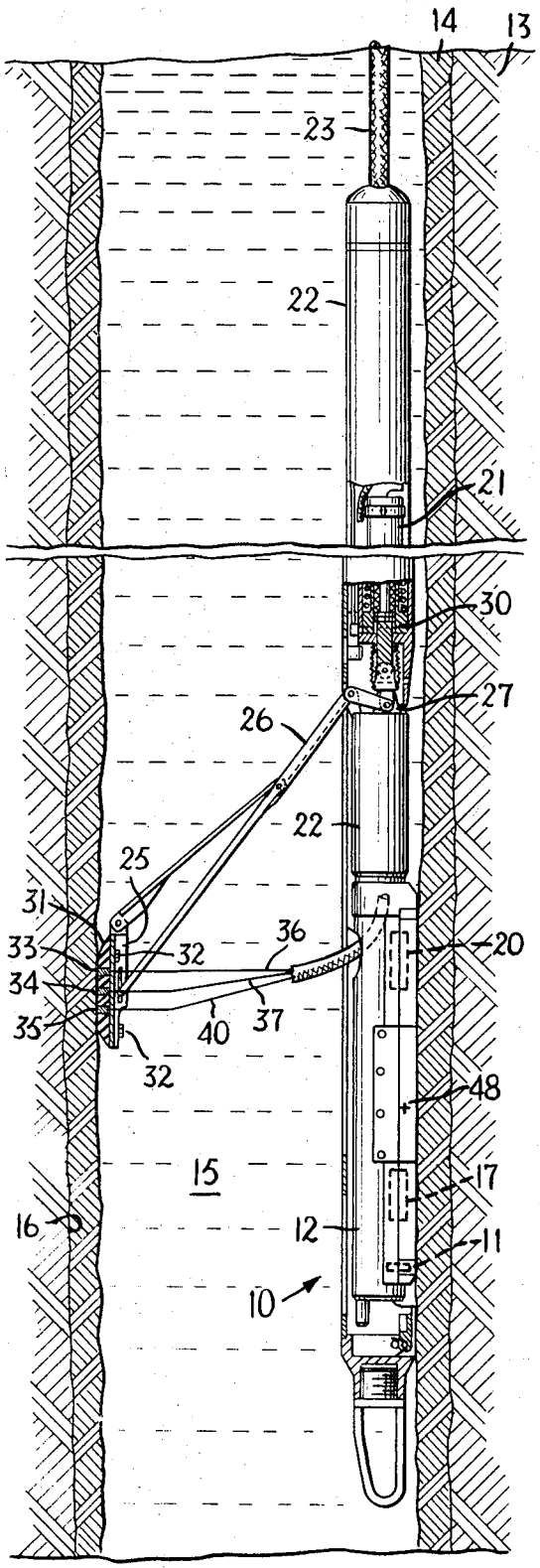
FIG. 1 is a schematic diagram in partial section illustrative of the principles of the invention.

FIG. 1 shows a typical gamma radiation logging tool 10 of the type described in more complete detail in John S. Wahl, U.S. Pat. No. 3,321,625. In general, a gamma radiation source 11 mounted within the lowermost portion of a skid 12 irradiates the adjacent portion of an earth formation 13 in order to measure the density of the formation in spite of the presence of a mudcake 14 that is formed when the filtrate from borehole fluids as, for instance a drilling mud 15 seeps into the formation 13 and deposits a residue on the wall of a borehole 16. A short-spaced gamma radiation detector 17 and a long-spaced gamma radiation detector 20 within the skid 12 are spaced at about eight and twenty-six inches, respectively, from the source 11. Signals from these detectors are sent to a processing circuit 21 in a fluid and pressure-tight housing 22 for transmission through an armored cable 23 to the earth's surface (not shown) for formation density analysis as described in more complete detail in the aforementioned Wahl patent.

The skid 12 is urged against the mudcake 14 and the formation 13 through a spring-biased hydraulic system 30 described in more complete detail in D. F. Saurenman, U.S. Pat. No. 3,254,221. Briefly, the skid 12 is pressed against one side of the borehole 16 through force exerted against the opposite side of the borehole by means of a shoe or backup pad 25, associated linkages 26 and 27, and a spring operated hydraulic system 30. This biasing system 30, which is activated in response to a signal transmitted from the earth's surface through the cable 23, causes the skid 12 and the shoe 25 to follow closely undulations in the wall of the borehole 16. This system prevents the drilling mud 15 from interfering with the quality of the radiation signal scattered back from the formation 13 to the detectors 17 and 20.

In accordance with a feature of the invention, the shoe 25 is made of steel, or the like. An electrically insulating pad 31 having beveled edges and formed of tough rubber, for example, is secured to the borehole wall oriented surface of the shoe 25. Typically, screws 32 or other suitable means fasten the pad 31 to the shoe 25 in order to interpose the pad between the surface of the shoe and the portion of the borehole wall that is diametrically opposite to the portion of the borehole that is engaged with the skid 12.

Three vertically spaced electrodes 33, 34 and 35 are supported in the electrically insulating matrix provided by the pad 31. The pad 31 electrically isolates the electrodes from the structure of the tool 10 and limits the electrical contact of these electrodes 33, 34 and 35 to the adjacent portion of the earth formation 13, or of the mudcake 14, as appropriate. The borehole contact surfaces of the electrodes, moreover, are flush with the wall engaging surface of the pad 31 in order to prevent the rough borehole surface from catching one or more of the electrodes and tearing them from the shoe 25.

Electrical characteristics of the formation 13 or the mudcake 14 are coupled from the electrodes 33, 34 and 35 through respective conductors 36, 37 and 40. The conductors 36, 37 and 40 are, of course, not only electrically insulated, but also are impervious to the drilling mud 15. Within the housing 22, the conductors are coupled to respective connectors (not shown) to enable the electrode signals to be sent through the cable 23 to the earth's surface.

Figure 3:
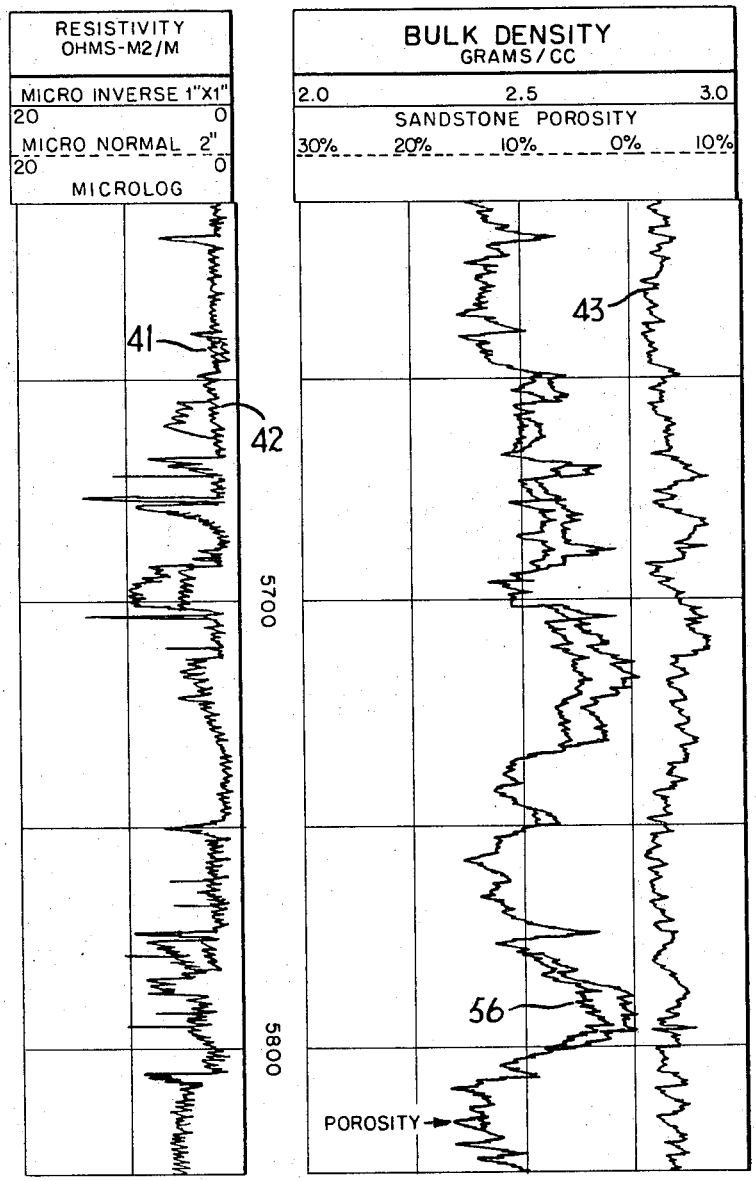
FIG. 3 is a typical log produced in accordance with the invention.

At the surface, these signals are recorded with signals derived from the gamma ray detectors 17 and 20 to produce respective logs (FIG. 3) preferably, of formation resistivity 41 and 42 and bulk density 43. To measure accurately the depth of the electrical and radioactivity observations within the borehole 16, a wheel coupled to the recorder paces a winch at the earth's surface (not shown) as the cable 23 is reeled in. The length of cable, measured to an arbitrarily chosen point 48 located about halfway between the geometric center of the source 11 and the geometric center of the active volume of the long-spaced detector 20 provides a suitable reference. In the illustrative embodiment of the invention shown in FIGS. 1 and 3 the electrodes 33, 34 and 35 are vertically spaced approximately one inch from each other, as described in more complete detail in H. G. Doll, U.S. Pat. No. 2,669,690. These electrodes provide two resistivity measurements 41 and 42 (FIG. 3), one having a depth of investigation about equal to the expected thickness of the mudcake 14, the other being more representative of the formation 13. In this situation, where no mudcake is present, the resistivities 41 and 42 will be about the same. Between 5690 feet and 5700 feet, however, the resistivities separate, indicating that the mudcake 14 is present and that the zone in question is permeable to fluids.

Figure 2:
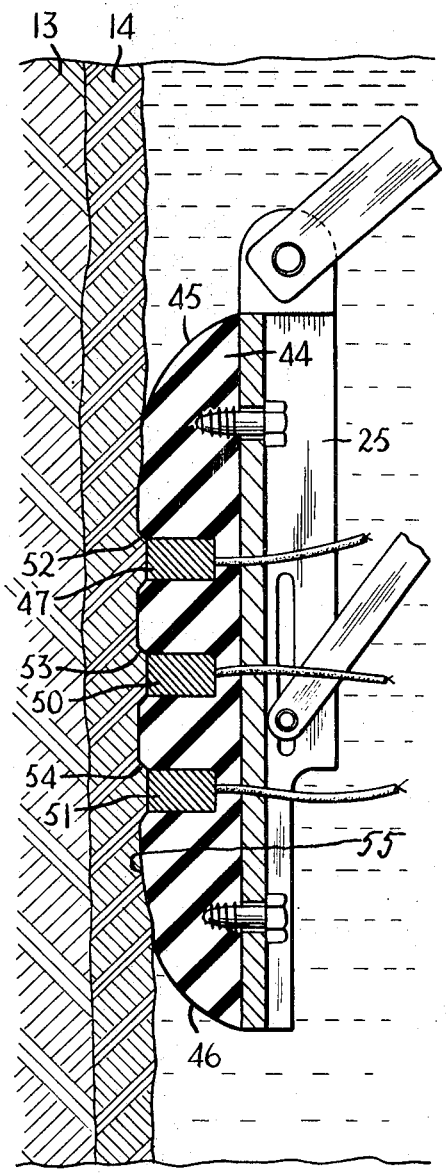
FIG. 2 is an alternative embodiment in full section of a portion of the apparatus shown in FIG. 1.

FIG. 2 shows an alternative embodiment for a pad 44 in accordance with the invention. Not only are leading edge 45 and trailing edge 46 beveled, but electrodes 47, 50 and 51 are in recesses 52, 53 and 54, respectively, from working surface 55 of the insulating rubber pad 44. The mudcake 14 flows into the recesses 52, 53 and 54 under the pressure applied by the shoe 25 in order to insure a good electrical contact to the electrodes 47, 50 and 51 without exposing the electrodes to damage from borehole roughness. In the embodiment of FIG. 2 it is clear that the distance between the borehole wall contacting portion of the skid 12 and the contact surfaces of the electrodes 47, 50 and 51 is less than the overall diameter of the borehole 16 at the corresponding depth.

In operation, the skid 12 (FIG. 1), the shoe 25 and the associated pad 31 are retracted against the housing 22 in order to allow the tool to pass downwardly through the borehole 16. At some predetermined depth, a command signal from the earth's surface activates the hydraulic system 30 in order to extend the skid 12 and the shoe 25 to engage the borehole walls. The electrical and radioactivity logging systems also are energized. The cable 23 is reeled in at the earth's surface and a record is made of the electrical and radioactivity characteristics of the formation as a function of borehole depth while the tool is drawn through the borehole 16.

In subsequent logging runs other apparatus as, for example, the neutron logging tool described in C. W. Tittle, U.S. Pat. No. 2,769,918 for measuring the porosity of the earth formation 13 can be used in connection with the logs shown in FIG. 3. In this circumstance, a skid containing a neutron source and an epithermal neutron detector (not shown) is substituted on the housing 22 for the skid 12 that contains the gamma radiation tool 10 (FIG. 1). The converted apparatus then is lowered through the borehole. With the neutron tool and the electrical logging tool activated the formation 13 is logged as the tool is withdrawn from the borehole in order to provide a graph 56 (FIG. 3) of formation porosity as a function of the borehole depth. Because of the aforementioned differences in time constants and logging speeds for neutron and gamma ray logging, depth correlation between the logs 43 and 56 is not entirely accurate. The electrical log taken during the neutron logging run, however, almost duplicates the electrical log 41 and 42 acquired during the first trip through the borehole. By overlaying the two consecutively acquired sets of electrical logs, the radioactivity logs automatically are depth matched.

Thus, there is provided a combined electrical and radioactivity logging apparatus in which many of the unsatisfactory characteristics of the prior art have been overcome. The increased flexibility of the tool under consideration, moreover, allows separately acquired logs to be accurately depth-matched on the basis of the common electrical log.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A logging tool for transport through a borehole comprising a housing, means for selective extension from said housing to engage an approximately opposite side of the borehole, a radiation source and at least two radiation detectors spaced therefrom at different vertical distances above said radiation source both of said detectors and said source being urged against one of said opposing borehole sides by said selective extension means, and at least one electrode electrically insulated from said housing and the fluids within the borehole by said selective extension means, said extension means urging said electrode into electrical contact with the other of said opposing borehole sides.

2. A logging tool according to claim 1 further comprising a shoe for urging said electrode against said other borehole side, and electrical insulation means interposed between said shoe and said other borehole side having a surface for engagement with said side and at least one recess formed in said engaging surface to support the electrical contact surface of said electrode flush with said engaging surface.

3. A logging tool according to claim 1 further comprising a shoe for urging said electrode against said other borehole side, and electrical insulation means interposed between said shoe and said other borehole side having a surface for engagement with said side and at least one recess formed in said engaging surface to support the electrical contact surface of said electrode a predetermined distance away from said other borehole side.

4. A logging tool according to claim 1 comprising a skid for housing said radiation source and said detectors for movement against said one borehole side, and further means for moving both said selective extension means and said skid against said respective opposing borehole sides.

5. A method for depth matching borehole logs comprising the steps of running a first radioactivity earth formation log, running simultaneously at least a two-signal electrical log, recording said simultaneously acquired logs as a function of borehole depth, running a subsequent radioactivity earth formation log, running simultaneously with said subsequent log the same electrical log as that which first was run, recording said subsequently acquired logs as a function of borehole depth, and matching common features of both of said electrical logs in order to correlate in borehole depth said separately run radioactivity earth formation logs.

References Cited

UNITED STATES PATENTS

| | | | |
|---|---|---|---|
| 2,476,137 | 7/1949 | Doll | 250—83.6 |
| 2,778,950 | 1/1957 | Frey, Jr. et al. | 250—83.6 |
| 2,879,402 | 3/1959 | Ferre | 250—83.6 |
| 3,132,298 | 5/1964 | Doll et al. | 324—10 |
| 3,320,803 | 5/1967 | Lord | 73—152 |
| 3,333,466 | 8/1967 | Oliver | 73—151 |
| 2,999,936 | 9/1961 | Herzog et al. | 73—152X |

JERRY W. MYRACLE, Primary Examiner

U.S. Cl. X.R.

250—83.6; 324—10